United States Patent
Suzuki et al.

(10) Patent No.: US 8,134,334 B2
(45) Date of Patent: Mar. 13, 2012

(54) VEHICLE

(75) Inventors: Naoto Suzuki, Fujinomiya (JP); Motohiro Nakashima, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 397 days.

(21) Appl. No.: 12/449,716

(22) PCT Filed: Apr. 8, 2008

(86) PCT No.: PCT/JP2008/057230
§ 371 (c)(1), (2), (4) Date: Aug. 24, 2009

(87) PCT Pub. No.: WO2008/126930
PCT Pub. Date: Oct. 23, 2008

(65) Prior Publication Data
US 2010/0026238 A1    Feb. 4, 2010

(30) Foreign Application Priority Data
Apr. 9, 2007   (JP) .................................. 2007-101811

(51) Int. Cl.
*H01M 10/46* (2006.01)
(52) U.S. Cl. ........................................ 320/107; 362/459
(58) Field of Classification Search .................. 320/107, 320/109, 114, 115; 362/459, 487, 496, 506
See application file for complete search history.

(56) References Cited

U.S. PATENT DOCUMENTS

| | | | |
|---|---|---|---|
| 6,424,099 B1 * | 7/2002 | Kirkpatrick et al. | 315/248 |
| 2006/0178028 A1 * | 8/2006 | Swiatek et al. | 439/215 |
| 2007/0189027 A1 | 8/2007 | Sakakibara | |

FOREIGN PATENT DOCUMENTS

| | | |
|---|---|---|
| JP | A 6-325834 | 11/1994 |
| JP | A-7-87607 | 3/1995 |
| JP | A 9-161898 | 6/1997 |
| JP | A 2001-244028 | 9/2001 |
| JP | A 2004-106624 | 4/2004 |
| JP | A 2006-117207 | 5/2006 |

OTHER PUBLICATIONS

Notification of the First Office Action for Corresponding Chinese Application No. 200880011409.6, dated Nov. 3, 2010 (w/ English translation).

* cited by examiner

*Primary Examiner* — Edward Tso
(74) *Attorney, Agent, or Firm* — Oliff & Berridge, PLC (57) ABSTRACT

Light applied from an illumination unit illuminates a space formed of an accommodation unit, and facilitates a user's operation of coupling a charging connector to an electric power-receiving unit. When a lid unit is in a closed state, a part of the light applied from the illumination unit toward the accommodation unit transmits through a light transmission member provided at the lid unit and leaks toward a space outside a vehicle body. The leaked light enables a user to visually perceive the position of the charging port at a glance even if the lid unit is in the closed state.

4 Claims, 5 Drawing Sheets

FIG.5

VEHICLE

TECHNICAL FIELD

The present invention relates to a vehicle capable of utilizing electric power supplied from an external power source, and particularly relates to a user-friendly structure for performing external charging.

BACKGROUND ART

A so-called electric-powered vehicle such as an electric vehicle, a hybrid vehicle, or a fuel-cell vehicle is mounted with a power storage device made of a secondary battery, a capacitor, or the like, and travels by generating driving force from electric power stored in the relevant power storage device.

An electric vehicle does not have an electric power-generating function configured with an engine and others, and thus it has conventionally been required to store electric power to be used for traveling in the power storage device mounted thereon, with use of electric power of an external power source such as a commercial power source. In addition, as to an electric-powered vehicle such as a hybrid vehicle or a fuel-cell vehicle, which has an electric power-generating mechanism, there has also been proposed a technique of charging the power storage device mounted thereon with use of a commercial power source or the like having high electric power-generating efficiency to thereby achieve higher fuel consumption efficiency. In particular, attention has been focused on a configuration that uses a commercial power source supplied to each household and having a relatively low voltage (e.g. 100 V or 200 V) to charge the power storage device mounted on the electric-powered vehicle.

A location for resupplying fuel (e.g. petrol) for operating an engine is limited to a location such as a specific fueling station, whereas a location for externally charging a power storage device mounted on an electric-powered vehicle is less limited. In particular, if a commercial power source having a relatively low voltage is used for external charging, it becomes possible to externally charge an electric-powered vehicle while parking the vehicle in, for example, a garage of each household.

In the case of externally charging the electric-powered vehicle in each household, a lighting fixture is not always fully equipped, in contrast to the case of resupplying fuel at the fueling station. Accordingly, from the viewpoint of further facilitating an operation of coupling an electric power-feeding unit (a typical example of which is a charging connector) for supplying electric power of the external power source to the electric-powered vehicle at night or the like, there has been disclosed a configuration in which a lighting fixture is provided at the vehicle or at the electric power-feeding unit.

For example, Japanese Patent Laying-Open No. 06-325834 discloses charging connectors for an electric vehicle, which are identified as connectors arranged at the vehicle and at a charger, respectively, and capable of being fitted into each other, a connector housing located at any one of the vehicle and the charger being provided with light-emitting means. Further, Japanese Patent Laying-Open No. 09-161898 discloses charging connectors for an electric vehicle, in which a casing body of an electric power-feeding side connector is provided with an illumination chamber having an indicator lamp set therein, and the indicator lamp is configured with a two color-type LED that can emit light of colors different between during standby where the electric power-feeding side connector is connected to a charger, and during energization.

However, a charging port provided at the vehicle, to which the electric power-feeding unit is coupled, is generally provided with an opening/closing lid to prevent intrusion of water and the like into the charging port when external charging is not performed. The charging port is therefore closed with the opening/closing lid before the electric power-feeding unit is coupled thereto. Accordingly, as disclosed in Japanese Patent Laying-Open No. 06-325834, even if a lamp (light-emitting means) is provided in a housing at the vehicle, there arises a problem in which a vehicle user (user) has difficulties in visually perceiving the position of the charging port when vehicle surroundings are dark.

Therefore, the user has to search for the position of the charging port with the help of light emitted from a charging connector, as disclosed in Japanese Patent Laying-Open No. 09-161898, and thus resulting in a problem of causing the user to feel burdensome.

DISCLOSURE OF THE INVENTION

The present invention has been made to solve such problems, and an object of the present invention is to provide a vehicle that enables a position of the charging port provided at the vehicle body to be easily specified and enables the electric power-feeding unit to be easily coupled to the relevant charging port, even if vehicle surroundings are dark such as at night.

According to an aspect of the present invention, a vehicle capable of utilizing electric power supplied from an external power source is provided. The vehicle includes: an accommodation chamber opened at a vehicle external surface, and for accommodating an electric power-receiving unit for receiving the electric power supplied from the external power source; an illumination unit being in communication with the accommodation chamber and for applying light to at least the accommodation chamber; and a lid unit capable of closing an opening of the accommodation chamber, the lid unit including a light transmission member as at least a part of the lid unit.

Preferably, the accommodation chamber includes a surface formed to be concave with respect to the vehicle external surface.

More preferably, the illumination unit further includes another surface formed to be concave with respect to the surface formed to be concave.

Further preferably, the illumination unit is disposed on a vertically upper side of the accommodation chamber.

Further preferably, the lid unit is configured to be rotatable about an axis of rotation extending in parallel with one side of the opening of the accommodation chamber.

According to the present invention, it is possible to achieve a vehicle that enables a position of the charging port provided at the vehicle body to be easily specified and enables the electric power-feeding unit to be easily coupled to the relevant charging port, even if vehicle surroundings are dark such as at night.

BEST MODES FOR CARRYING OUT THE INVENTION

An embodiment of the present invention will hereinafter be described in detail with reference to the drawings. It is noted that the same or corresponding portions in the drawings are provided with the same reference characters, and the description thereof will not be repeated.

In the embodiment of the present invention, a vehicle 100, which is identified as a hybrid vehicle, will be described as an example. However, vehicle 100 is not limited thereto as long as it is a vehicle capable of receiving electric power from an external power source.

Vehicle 100 according to the embodiment of the present invention has an engine, and an electric motor that is rotatably driven by electric power supplied from a mounted power storage device, and achieves high fuel consumption efficiency by allowing each of the engine and the electric motor to generate driving force at an optimally-allocated rate. Further, the power storage device mounted on vehicle 100 can be charged with electric power of an external power source (an example of which is a commercial power source). In other words, vehicle 100 utilizes electric power supplied from the external power source and received at an electric power-receiving unit.

Figure 1:
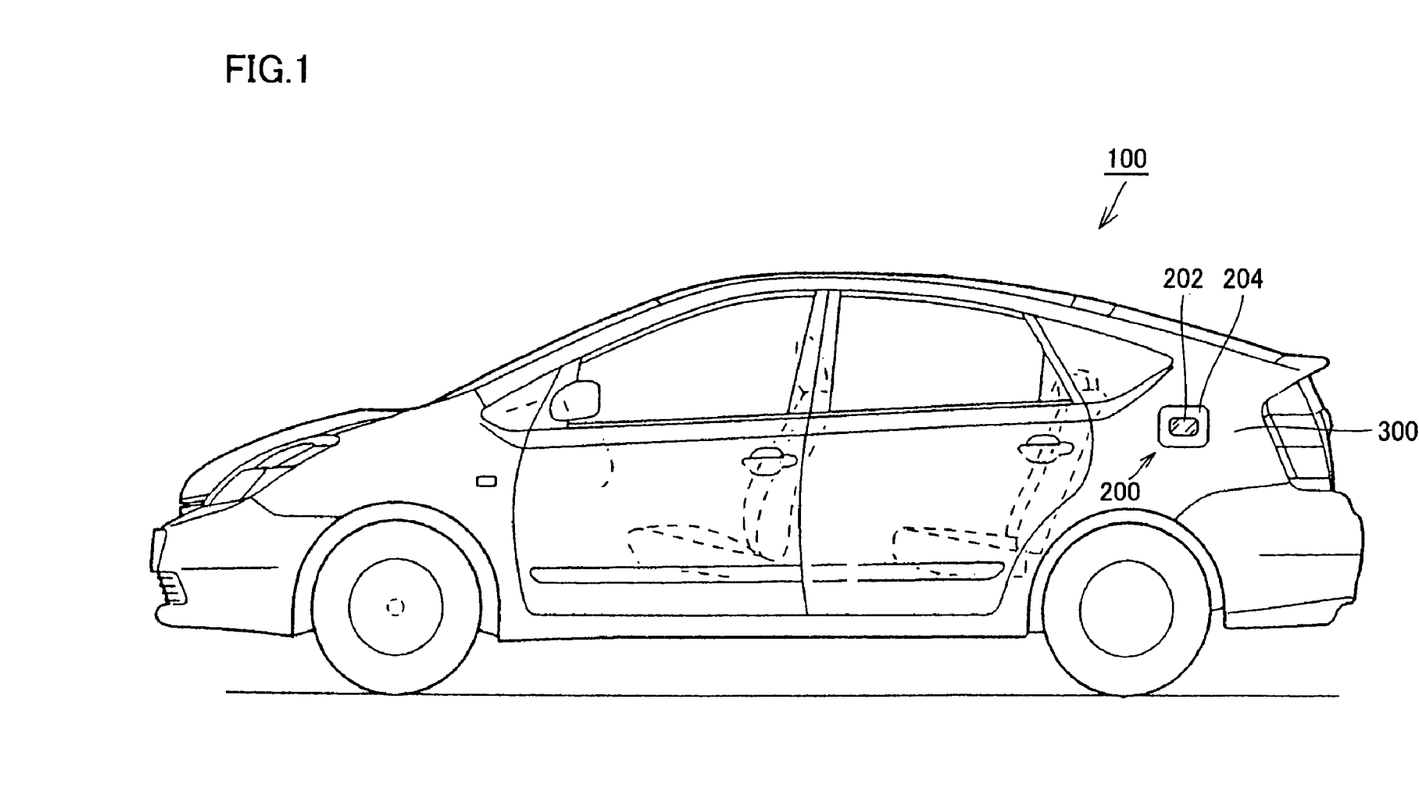
FIG. 1 is a side view of a vehicle according to an embodiment of the present invention.

FIG. 1 is a side view of a vehicle 100 according to an embodiment of the present invention.

With reference to FIG. 1, as an example, a charging port 200, into which an electric power-feeding unit (not shown) for supplying electric power from an external power source is inserted, is formed at a vehicle body (body) 300. Charging port 200 has a space opened at a vehicle external surface of vehicle body 300, includes in this space an electric power-receiving unit (electrode) to be coupled to the electric power-feeding unit, and has an opening/closing lid 204 turnably provided thereat for preventing intrusion of water, dust, and others into the electric power-receiving unit. By allowing opening/closing lid 204 to turn, charging port 200 is closed or opened. Furthermore, when closed, opening/closing lid 204 is configured to be contiguous with the vehicle external surface. Although FIG. 1 illustrates a configuration in which charging port 200 is formed rearward at a lateral surface of vehicle body 300, charging port 200 may be formed at any position, such as forward at a lateral surface, at a rear surface, or at a front surface.

Further, a filler opening (not shown) for supplying fuel for operating an engine is formed at the vehicle body of vehicle 100 according to the present embodiment.

In particular, in vehicle 100 according to the present embodiment, opening/closing lid 204 includes a light transmission member 202 as at least a part thereof, which is a member that allows light to transmit therethrough, such that a user can specify the position of charging port 200 at a glance even if vehicle surroundings are dark such as at night. At least a part of the light applied from an illumination unit (not shown) disposed inside charging port 200 transmits through light transmission member 202 and leaks to an external space outside vehicle body 300. In other words, with the help of the light that has transmitted through and leaked from light transmission member 202, a user can easily grasp the position of charging port 200 even if surroundings of vehicle 100 are dark.

Initially, a configuration of vehicle 100 will hereinafter be described with reference to FIGS. 2 and 3.

Figure 2:
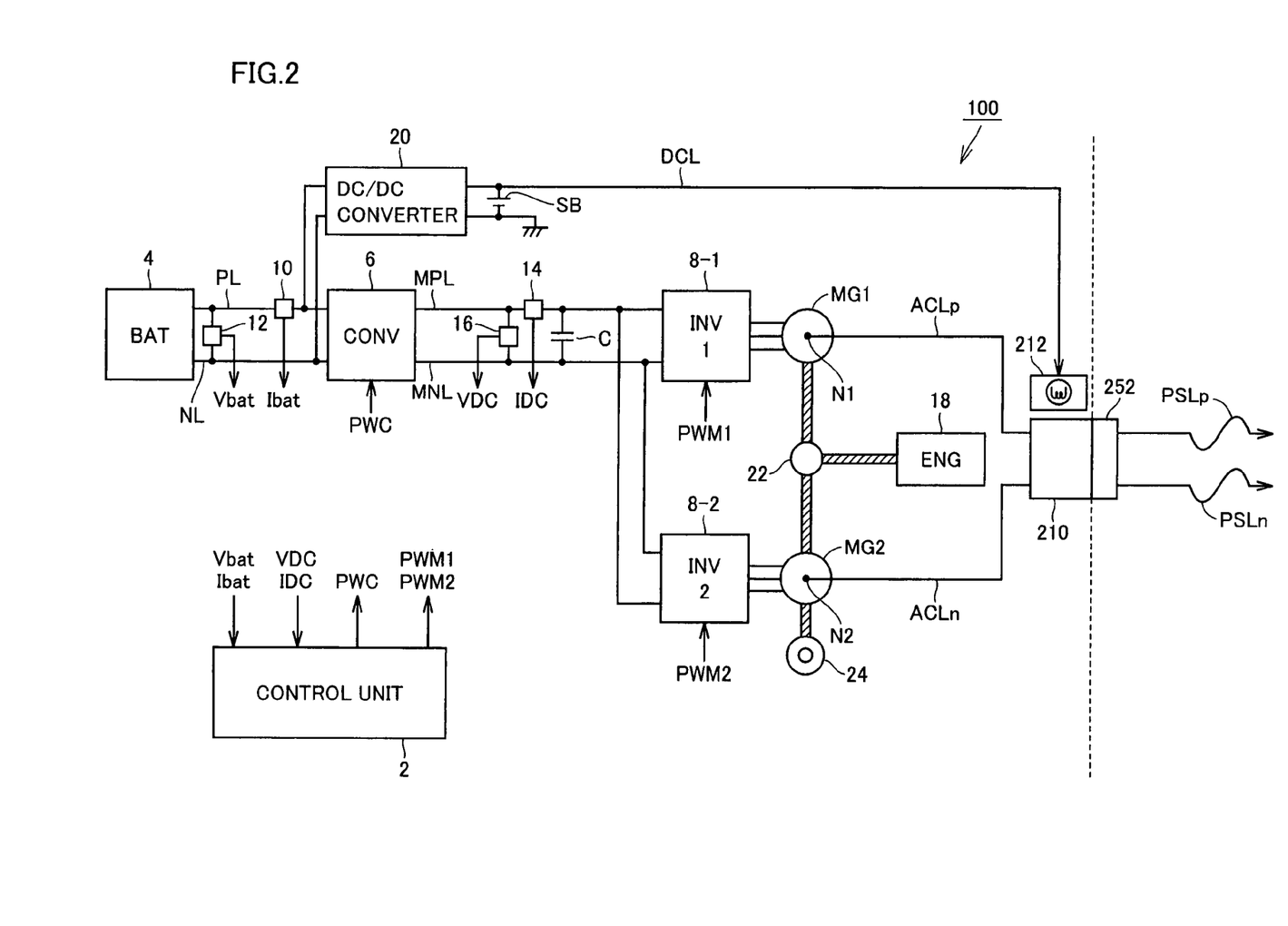
FIG. 2 is a schematic configurational view of the vehicle according to the embodiment of the present invention.

With reference to FIG. 2, vehicle 100 is typically a parallel/series-type hybrid vehicle, and includes an engine ENG operated by combustion of fuel, a first motor generator MG1 capable of generating electric power by receiving a part of motive power from engine ENG, and a second motor generator MG2 operating as an electric motor by electric power supplied from at least a power storage device (BAT) 4. Engine ENG and motor generators MG1 and MG2 are mechanically coupled to one another via a power split device 22, which is typically made of a planetary gear mechanism.

During traveling of vehicle 100 (i.e. when external charging is not performed), power split device 22 splits the driving force generated by the operation of engine ENG into two components, and allocates one of them to first motor generator MG1, and the other of them to second motor generator MG2. The driving force allocated from power split device 22 to first motor generator MG1 is used for an electric power-generating operation, while the driving force allocated to second motor generator MG2 is combined with the driving force generated at second motor generator MG2, and used for driving drive wheels 24.

In the case that power storage device 4 is externally charged, it can be fully charged, and hence it is possible to achieve a so-called EV (Electric Vehicle) traveling in which only the driving force generated at second motor generator MG2 is used for traveling while engine ENG is maintained in a non-operation state.

Vehicle 100 further includes a first inverter (INV1) 8-1 and a second inverter (INV2) 8-2 made to correspond to motor generators MG1 and MG2, respectively. Inverters 8-1 and 8-2 are electrically connected in parallel with respect to power storage device 4, and when vehicle 100 travels (i.e. when external charging is not performed), make conversion between direct-current electric power and alternating-current electric power. Mainly, first inverter 8-1 converts alternating-current electric power generated at first motor generator MG1 into direct-current electric power in accordance with a switching command PWM1 from a control unit 2, and supplies the direct-current electric power to a main positive bus MPL and a main negative bus MNL. In contrast, second inverter 8-2 converts direct-current electric power supplied via main positive bus MPL and main negative bus MNL into alternating-current electric power in accordance with a switching command PWM2 from control unit 2, and supplies the alternating-current electric power to second motor generator MG2.

Power storage device 4 is a rechargeable electric power storage element, and is configured with a secondary battery such as a lithium-ion battery or a nickel-hydrogen battery, or a storage element such as an electric double layer capacitor, as an example. Step-up/down converter (CONV) 6 for allowing direct-current voltage to be stepped up and stepped down is disposed between power storage device 4 and inverters 8-1 and 8-2, and allows an input/output voltage of power storage device 4 and a line voltage between main positive bus MPL and main negative bus MNL to be converted bi-directionally. The step-up/down operations at step-up/down converter 6 are controlled in accordance with a switching command PWC from control unit 2.

The configuration of a hybrid vehicle serving as the vehicle is not limited to the above-described configuration. For example, a so-called parallel-type hybrid vehicle or series-type hybrid vehicle may also be adopted. Furthermore, the number of motor generators may also be set freely as appropriate, and the configuration mounted with only a single motor generator (electric motor) may also be adopted as in most parallel-type hybrid vehicles.

Furthermore, the number of power storage devices to be mounted thereon may be set as appropriate in accordance with traveling performance and the like. In other words, it may also be possible to adopt the configuration mounted with a plurality of power storage devices such that more electric power can be stored.

Typically, control unit 2 is formed of an ECU (Electronic Control Unit) mainly made of a CPU (Central Processing Unit), a memory unit such as a RAM (Random Access Memory) or a ROM (Read Only Memory), and an input/output interface unit. Control unit 2 controls each unit of vehicle 100 in accordance with a program stored in advance, based on information obtained from various sensors. As an example of the information inputted to control unit 2, FIG. 2 shows a battery current Ibat obtained from a current sensor 10 inserted into a positive line PL, a battery voltage Vbat obtained from a voltage sensor 12 connected between positive line PL and a negative line NL, a bus current IDC obtained from a current sensor 14 inserted into main positive bus MPL, and a bus voltage VDC obtained from a voltage sensor 16 connected between main positive bus MPL and main negative bus MNL.

Further, a DC/DC converter 20 is electrically connected in parallel to step-up/down converter 6 with respect to power storage device 4. DC/DC converter 20 steps down electric power discharged from power storage device 4 to generate auxiliary equipment electric power. The voltage of auxiliary equipment electric power is set to be lower (e.g. 12V or 24V) than the charging and discharging voltage of the power storage device (e.g. 288 V). The auxiliary equipment electric power generated at DC/DC converter 20 is supplied to various auxiliary equipment of vehicle 100, not shown, via a low-voltage supply line DCL, and a part of it is supplied to an auxiliary equipment battery SB. Auxiliary equipment battery SB is a rechargeable electric power storage element that stores auxiliary equipment electric power. With use of auxiliary equipment battery SB, auxiliary equipment electric power can be supplied to each of auxiliary equipment, even if vehicle 100 is in a halt state (ignition off state).

Furthermore, as described below, the auxiliary equipment electric power is also supplied to an illumination unit 212 for applying light to an internal space of charging port 200 (FIG. 1).

Next, in the case that vehicle 100 is to be externally charged, a charging connector 250, which is a typical example of an electric power-feeding unit, is coupled to charging port 200 (FIG. 1). More specifically, charging connector 250 is mechanically coupled to and electrically connected to an electric power-receiving unit 210 accommodated in charging port 200, to form an electrical input path between the external power source and power storage device 4.

For the external power source, any type of power source may be used regardless of what voltage value it has, and whether it is of a direct-current type or an alternating-current type. A commercial power source supplied to each household, a solar photovoltaic panel disposed on a roof of each household, and others can be considered as typical examples.

In the present embodiment, there will typically be illustrated a configuration in which a single-phase alternating-current commercial power source (its voltage value is approximately 100 V to 200 V) is used as an external power source. In the present embodiment, there will be illustrated a configuration in which such a single-phase alternating-current commercial power source is received in vehicle 100 via a neutral point N1 of motor generator MG1 and a neutral point N2 of motor generator MG2, to externally charge power storage device 4.

After charging connector 250 is coupled to electric power-receiving unit 210, supply lines PSLp and PSLn that transport electric power from the external power source are electrically connected to neutral point N1 of motor generator MG1 and neutral point N2 of motor generator MG2 via electric power-receiving lines ACLp and ACLn, respectively. Each of motor generators MG1 and MG2 includes a stator made of Y-connected (star-connected) three-phase coils. A point at which these coils are connected to one another in the Y-connection corresponds to each of neutral points N1 and N2 of motor generators MG1 and MG2.

Electric power of the external power source is supplied to neutral points N1 and N2 of motor generators MG1 and MG2, so that a voltage value of supply line PSLp is applied to respective phases of first inverter 8-1 at the alternating-current ports, and a voltage value of supply line PSLn is applied to respective phases of second inverter 8-2 at the alternating-current ports. Inverters 8-1 and 8-2 are then allowed to appropriately perform a switching operation, so that direct-current electric power having a prescribed voltage value is supplied from inverters 8-1 and 8-2 to main positive bus MPL and main negative bus MNL.

More specifically, each of inverters 8-1 and 8-2 has three arm circuits corresponding to the respective phases (three phases) at the alternating-current ports. Each of the arm circuits includes an upper arm circuit and a lower arm circuit, each of which is made of at least one switching element. In each of inverters 8-1 and 8-2, the upper arm circuits corresponding to the respective phases are collectively caused to perform an on/off operation, and the lower arm circuits corresponding to the respective phases are also collectively caused to perform an on/off operation. As a result, in each of inverters 8-1 and 8-2, the three upper arm circuits can be regarded as being in the same switching state (all of them are on or off), and the three lower arm circuits can also be regarded as being in the same switching state. With such a switching operation, the respective phase voltages can be equal to one another. Such a switching mode is also referred to as a zero-phase mode.

Figure 3:
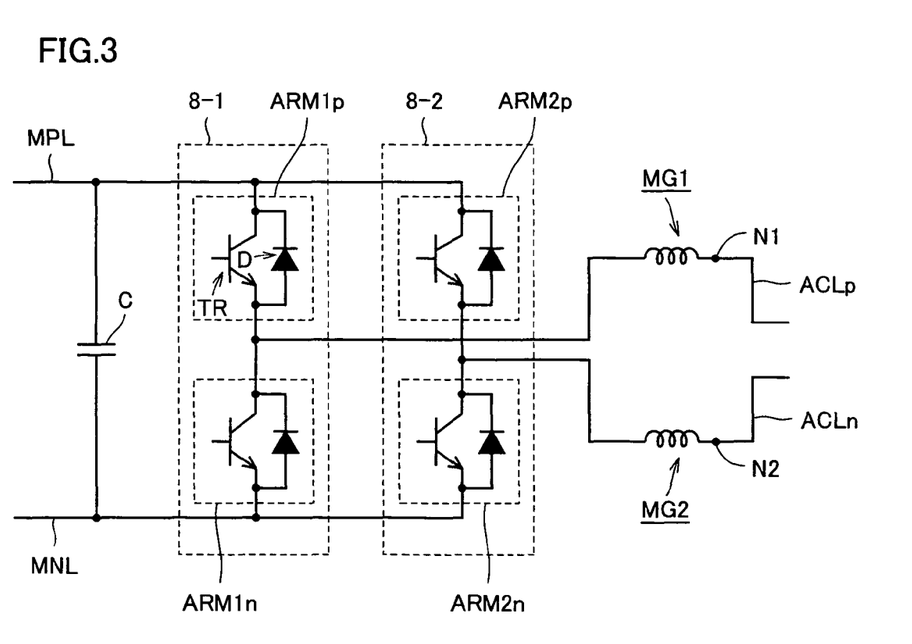
FIG. 3 is a zero-phase equivalent circuit of inverters and motor generators in a zero-phase mode.

FIG. 3 is a zero-phase equivalent circuit of inverters 8-1 and 8-2 and motor generators MG1 and MG2 in a zero-phase mode.

With reference to FIG. 3, when inverters 8-1 and 8-2 perform switching operations in accordance with the zero-phase mode described above, the three upper arm circuits in inverter 8-1 are collectively shown as an upper arm ARM1p, and the three lower arm circuits in inverter 8-1 are collectively shown as a lower arm ARM1n. Each of upper arm ARM1p and lower arm ARM1n is made of a switching element TR and a freewheeling diode D. Similarly, the three upper arm circuits in inverter 8-2 are collectively shown as an upper arm ARM2p, and the three lower arm circuits in inverter 8-2 are collectively shown as a lower arm ARM2n.

The zero-phase equivalent circuit shown in FIG. 3 can be regarded as a single-phase inverter capable of converting the direct-current electric power supplied via main positive bus MPL and main negative bus MNL into single-phase alternating-current electric power, and capable of converting the single-phase alternating-current electric power inputted to neutral points N1 and N2 via electric power-receiving lines ACLp and ACLn, respectively, into direct-current electric power.

In other words, by controlling switching commands PWM1 and PWM2 to implement a zero-phase mode, it is possible to operate each of inverters 8-1 and 8-2 as a circuit equivalent to a single-phase inverter, to convert the single-phase alternating-current electric power supplied from the external power source into direct-current electric power and supply the direct-current electric power to main positive bus MPL and main negative bus MNL. Power storage device 4 is externally charged with this direct-current electric power.

The configuration that externally charges power storage device 4 is not limited to the configuration in FIGS. 2 and 3. For example, when alternating-current electric power from a commercial power supply or the like is used to charge power storage device 4, for example, a rectifier device or inverter device for converting alternating-current electric power into direct-current electric power may be provided at a house or the like outside the vehicle to supply direct-current electric power from the house to the vehicle such that power storage device 4 can be directly charged. At this time, if there is a voltage difference between a voltage of the direct-current electric power obtained by being converted from alternating-current electric power and a charging and discharging voltage of power storage device 4, it may also be possible to adopt a configuration in which a DC/DC converter or the like capable of converting the voltage of the direct-current electric power is provided at the house or the vehicle so as to supply direct-current electric power having a voltage that is adapted to the charging and discharging voltage of power storage device 4.

In the case that direct-current electric power generated by a solar photovoltaic panel or the like is used to charge power storage device 4, the relevant direct-current electric power may be supplied to the vehicle as it is, or with its voltage converted at the house.

Moreover, auxiliary equipment battery SB may externally be charged in place of power storage device 4, or together with power storage device 4. For example, while power storage device 4 is being externally charged as described above, DC/DC converter 20 may be operated to charge auxiliary equipment battery SB. Further, by ensuring that DC/DC converter 20 performs a bidirectional operation in converting electric power, it may also be possible to adopt a configuration in which auxiliary equipment battery SB is externally charged with a relatively low voltage (a voltage of auxiliary equipment electric power). With such a configuration, by allowing DC/DC converter 20 to convert electric power from a low voltage to a high voltage during external charging of auxiliary equipment battery SB, it is also possible to externally charge power storage device 4 as well as auxiliary equipment battery SB.

Next, with reference to FIGS. 4A, 4B and 5, a detailed configuration of charging port 200 will be described.

Figure 4A:
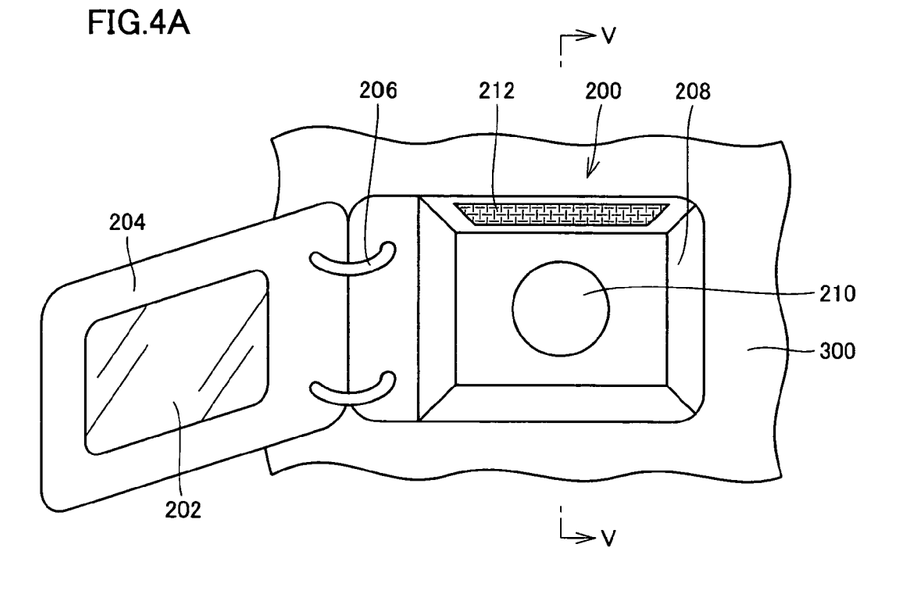
FIGS. 4A and 4B are external views of a charging port according to the embodiment of the present invention.
Figure 4B:
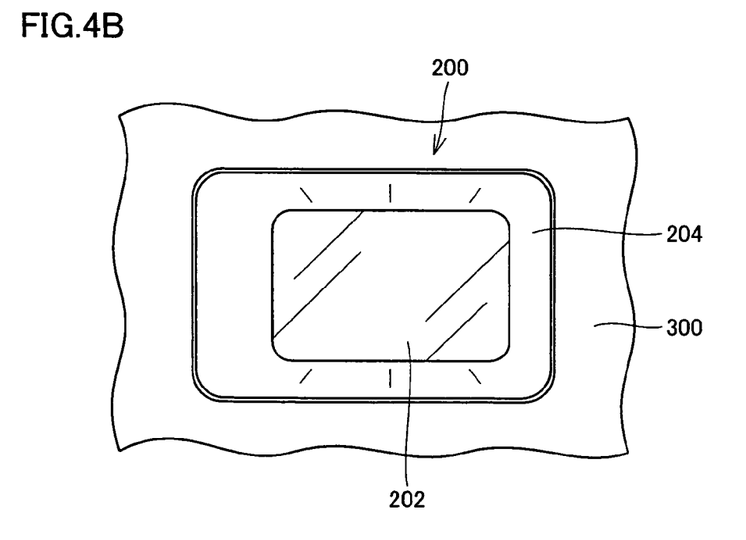

FIGS. 4A and 4B are external views of charging port 200 according to the embodiment of the present invention. FIG. 4A shows an opened state of opening/closing lid 204, while FIG. 4B shows a closed state of opening/closing lid 204. FIG. 5 is a cross-sectional view taken along a section line V-V shown in FIG. 4A.

Figure 5:
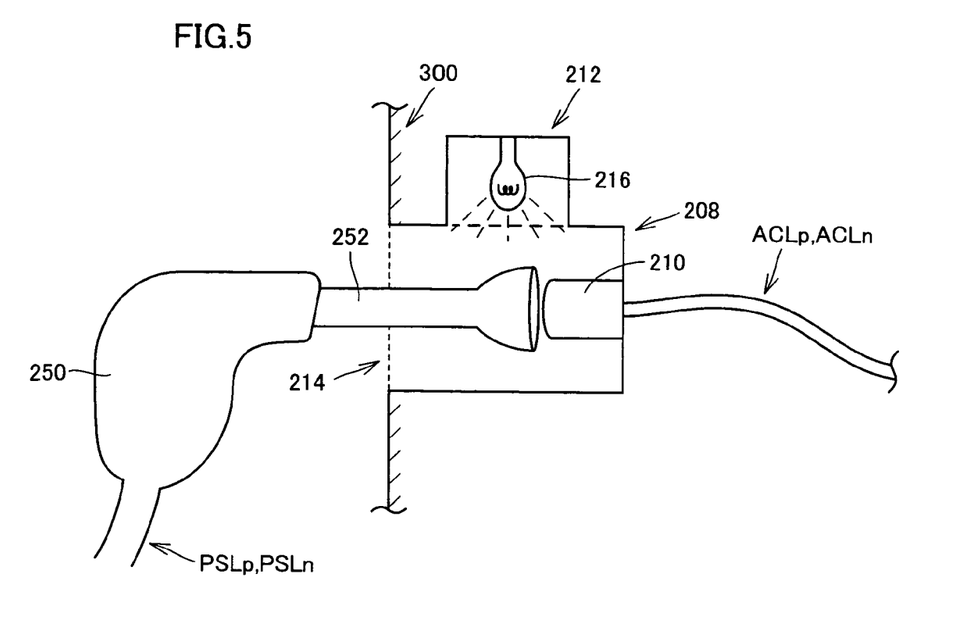
FIG. 5 is a cross-sectional view taken along a section line V-V shown in FIG. 4A.

With reference to FIGS. 4A and 5, charging port 200 includes an accommodation unit 208 formed to be concave with respect to the vehicle external surface of vehicle body 300. Accommodation unit 208 has an electric power-receiving unit 210 disposed therein, the electric power receiving unit 210 being formed to be cylindrical. Electric power-receiving unit 210 protrudes such that its one end can be fitted into a coupler unit 252 of a charging connector 250.

In other words, a chamber (accommodation unit 208) is formed from the vehicle external surface of vehicle body 300 toward an inside of the vehicle body, and electric power-receiving unit 210 is disposed at the innermost of the relevant chamber. Such an accommodation unit 208 may be formed integrally with the vehicle external surface (body surface), or alternatively, accommodation unit 208 having a prescribed accommodation chamber may be attached into an aperture made by removing a part of the vehicle external surface. In other words, the "surface formed to be concave with respect to the vehicle external surface." also includes the case that a hole is formed at a part of the vehicle external surface and a box is attached to cover an opening of the hole from an inner surface side of the vehicle body.

Opening/closing lid 204 provided at an exterior part of vehicle body 300 is rotatably supported by a support unit 206, and its turning operation allows an opening 214 of accommodation unit 208 to be closed or opened. In other words, opening/closing lid 204 can rotate about an axis of rotation extending in parallel with one side of opening 214 of accommodation unit 208. Furthermore, an aperture portion is formed at a central portion of opening/closing lid 204, and light transmission member 202 is disposed at the relevant aperture portion. Although FIGS. 4A and 4B illustrate a light transmission member having an approximately rectangular cross-sectional shape taken in a vertical direction, the cross-sectional shape of the light transmission member may be of any shape.

Further, an illumination unit 212 for applying light to an inside of accommodation unit 208 is provided in proximity to accommodation unit 208. Illumination unit 212 may be disposed at any position as long as it can apply light to accommodation unit 208. In the present embodiment, a configuration in which illumination unit 212 is provided on a vertically upper side of accommodation unit 208 is illustrated as a typical example. Illumination unit 212 has a chamber being in communication with accommodation unit 208, and a light source 216 is disposed in the relevant chamber. In other words, as shown in FIG. 5, illumination unit 212 is configured with a surface formed to be concave with respect to one of the surfaces formed to be concave with respect to the vehicle external surface, which surfaces configure accommodation unit 208. Light source 216 is made of a filament lamp, an LED (Light Emitting Diode), and the like, as an example, and is lit by auxiliary equipment electric power supplied from auxiliary equipment battery SB (FIG. 2)

The light applied from illumination unit 212 illuminates a space formed of accommodation unit 208, and facilitates a user's operation of coupling charging connector 250 to electric power-receiving unit 210.

With reference to FIG. 4B, if opening/closing lid 204 is in a closed state, a part of the light applied from illumination unit 212 toward accommodation unit 208 passes through light transmission member 202 provided at opening/closing lid 204, and leaks toward a space outside vehicle body 300.

The leaked light enables a user to visually perceive the position of charging port 200 at a glance even if opening/closing lid 204 is in a closed state. Therefore, even if vehicle surroundings are dark such as at night, a user can assuredly specify the position of charging port 200, and hence can easily couple charging connector 250 to electric power-receiving unit 210.

As described above, an object of the present invention is to enable a user to grasp the position of charging port 200 at a glance, even if opening/closing lid 204 is in a closed state. Therefore, even if opening/closing lid 204 is in a closed state, illumination unit 212 is lit. As such, the timing at which illumination unit 212 is lit can be controlled by radio communication means or the like between vehicle 100 and charging connector 250.

According to the embodiment of the present invention, even if opening/closing lid 204 is in a closed state, at least a part of the light applied by illumination unit 212 to accommodation unit 208 transmits through light transmission member 202, and is guided to the space outside vehicle body 300. This enables a user to visually perceive the position of charging port 200 at a glance even if vehicle surroundings are dark such as at night, and thus enables a user to easily couple charging connector 250 to electric power-receiving unit 210.

Further, according to the embodiment of the present invention, illumination unit 212 is disposed at a position which is less likely to be interfered as to an insertion direction of charging connector 250, so that it is possible to reduce the possibility of breakage of illumination unit 212, which would result from insertion of charging connector 250.

Further, according to the embodiment of the present invention, even if a charging port and a filler opening are formed at a vehicle body as in the hybrid vehicle that can externally be charged, a user can easily specify the position of the charging port, and hence it is possible to prevent the user from confusing between the charging port and the filler opening.

It should be understood that the embodiment disclosed herein is illustrative and not limitative in all aspects. The scope of the present invention is shown not by the description above but by the scope of the claims, and is intended to include all modifications within the equivalent meaning and scope of the claims.

The invention claimed is:

1. A vehicle capable of utilizing electric power supplied from an external power source, comprising:
   a lid unit disposed to form a space on a vehicle external surface and to face vehicle outside;
   an electric power-receiving unit, arranged in said space, for receiving the electric power from said external power source; and
   an illumination unit arranged in said space,
   said lid unit having a member transmitting light of the illumination unit to said vehicle outside,
   said space being formed by a surface formed to be concave with respect to said vehicle external surface and by said lid unit,
   said illumination unit being configured to illuminate said space through an opening provided in a part of said surface formed to be concave,
   said illumination unit being lit even when said lid unit is in a closed state.

2. The vehicle to claim 1, wherein
   said illumination unit is lit by electric power from a second battery different from a first battery charged via said electric power-receiving unit.

3. The vehicle according to claim 1, wherein
   said illumination unit is accommodated in a concave portion configured to be in communication with said space.

4. The vehicle according to claim 2, wherein
   said illumination unit is accommodated in a concave portion configured to be in communication with said space.

* * * * *